United States Patent

[11] 3,561,671

[72] Inventors Wayland M. Minot, Jr., deceased, late of Cambridge, Mass., by Elizabeth C. Minot, administratrix, 94 Foster St., Cambridge, Mass. 02138

[21] Appl. No. 790,898
[22] Filed Jan. 9, 1969
[45] Patented Feb. 9, 1971

[54] ENCLOSURE FOR RECORDS
2 Claims, 4 Drawing Figs.

[52] U.S. Cl. 229/71, 229/68; 206/62
[51] Int. Cl. B65d 27/04, B65d 85/30
[50] Field of Search 229/71, 68; 206/62PR

[56] References Cited

UNITED STATES PATENTS

| | | | |
|---|---|---|---|
| 1,667,482 | 4/1928 | Lee | 229/71X |
| 2,827,223 | 3/1958 | Allison | 229/68 |
| 2,289,118 | 7/1942 | Hatton | 229/68 |

*Primary Examiner*—David M. Bockenek
*Attorney*—Abbott Spear

ABSTRACT: A record enclosure is disclosed that includes a wrapper on which a record may be placed while held by its margins and marginal portions foldable over the member to prevent the escape of the record or finger contact with its grooves while the enclosure is being inserted in or removed from a jacket, one portion being a cover substantially the size and shape of the member.

Inventor
Wayland M. Minor Jr. Deceased
By Elizabeth C. Minor, Administratrix
By
Abbott Spear
Attorney Inventor
Wayland M. Minot Jr, Deceased
By Elizabeth C. Minot, Administratrix
By Albert Spear
Attorney

ENCLOSURE FOR RECORDS

The present invention relates to enclosures for phonograph records.

It is well known that the phonograph records are easily damaged unless properly handled. Proper handling requires not only that each record be held by its periphery to avoid finger engagement of the grooves but also that abrasion of the grooves be avoided, even that resulting from their frictional engagement with paper. The present practice is to utilize an open ended jacket of cardboard which slidably receives an open ended envelope of much more flexible and softer paper stock which slidably contains the record. While the record-containing envelopes may be made of a material sufficiently soft to minimize but not avoid groove damage due to friction, they are not convenient to use unless they are sufficiently stiff to enable them and their contained record to be inserted into their jackets in which case the likelihood of groove damage is increased.

The principal objective of the present invention is to provide means to eliminate friction as a source of record damage in removing them from or replacing them in their jackets and, at the same time, make it easier for the user digitally to engage and hold the periphery of a record while handling it. In accordance with the invention, this objective is attained by providing a record enclosure for insertion in a jacket in the form of a wrapper having a main portion dimensioned to enable a record to be laid thereon and marginal portions foldable inwardly over the thus positioned record to contain it without frictional contact with one such portion being dimensioned to function as a cover for the enclosure.

In the accompanying drawings, there is shown an embodiment of the invention illustrative of these and other of its objectives, novel features, and advantages.

Figures 1, 2, 3:
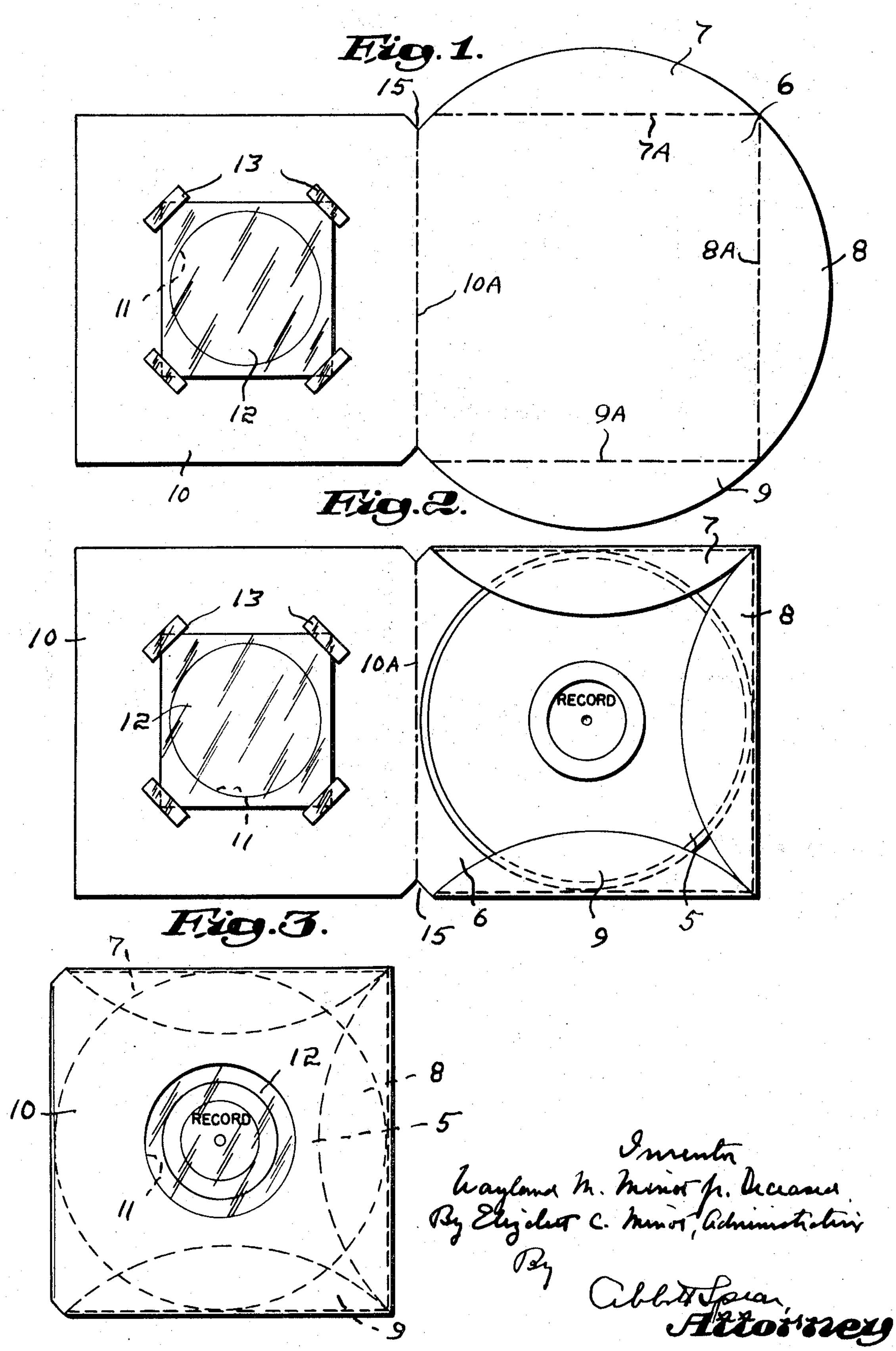
FIG. 1 is a plan view of the wrapper in its unfolded or open position.
FIG. 2 is a like view with a record placed on the main portion of the wrapper with marginal portions folded inwardly to contain the record along three sides of the main portion.
FIG. 3 is a plan view of the wrapper with its cover-establishing portion folded over to complete the containment, without friction, of the record.

In the embodiment of the invention illustrated by the drawings, a wrapper, for a record 5 is shown as having a main portion 6 and marginal portions 7, 8, 9, and 10 with fold lines indicated at 7A, 8A, 9A, and 10A respectively. The main portion 6 is so dimensioned that the distance between opposite fold lines is approximately equal to the diameter of the record 5.

With the record 5 placed on the main portion 6, the marginal portions 7, 8, and 9 are folded inwardly and it will be noted that while they then confine the record along three sides of the wrapper, they do not overlap and this preferred arrangement is desirably effected by making the portions 7, 8, and 9 arcuate with respect to the center of the main portion 6.

The marginal portion 10 is then folded to complete the enclosure of the record and it is dimensioned to establish a cover, being desirably substantially of the same size and shape as the main portion 6. The marginal portion 10 is shown as having a central hole 11 closed by a transparent plastic sheet 12 anchored by adhesive strip 13 thus to provide a window to enable the contained record 5 to be indentified without removing it.

Figure 4:
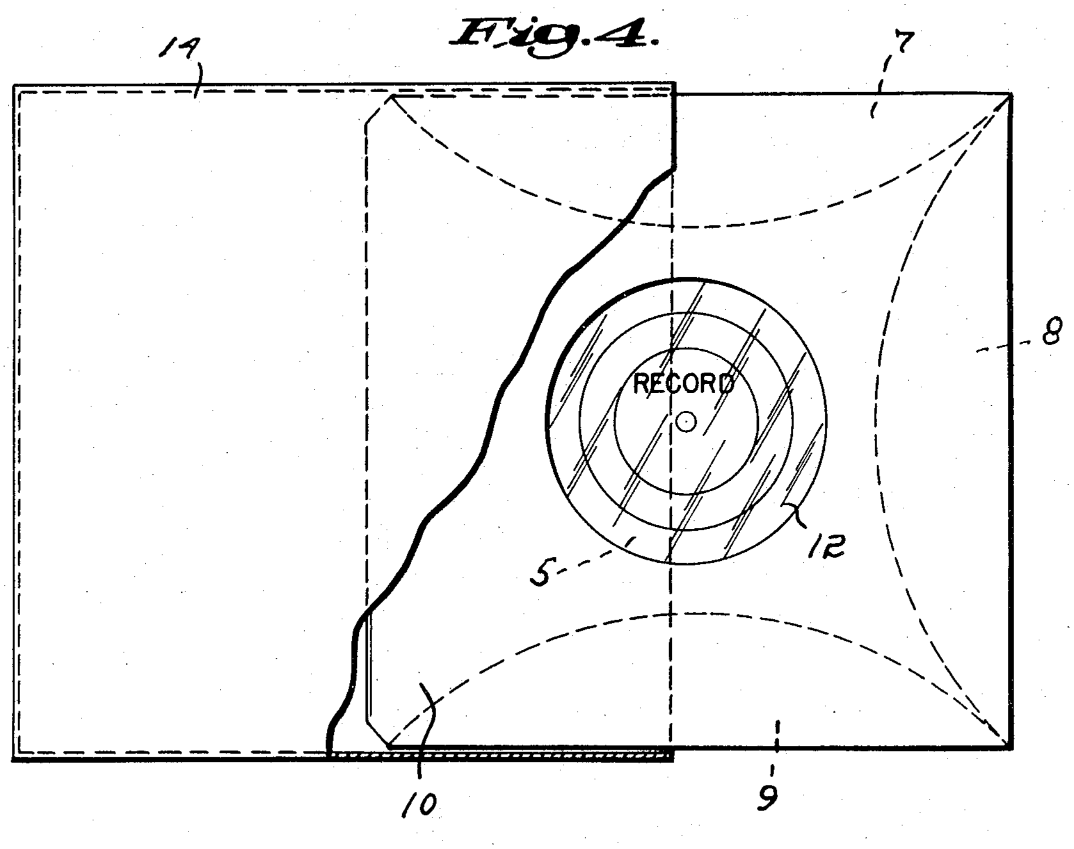
FIG. 4 is a partly sectioned plan view, on an increased scale, illustrating the insertion of the enclosed record into its jacket.

When the cover-establishing portion 10 is folded over the base portion 6 to complete the containment of the record 5, it is natural for its free edge and the corresponding edge of the main portion 6 to be digitally held. While the record 5 is confined by its wrapper against sliding movement, this result is ensured when the wrapped record is thus held while being inserted into or removed from its open ended jacket 14. Insertion of the wrapped record is facilitated by notches 15 at the ends of the fold line 10A, see FIGS. 1 and 2, which provide tapers at the corners of the of the jacket-entering end of the wrapped record, see FIGS. 3 and 4.

As the record 5 may thus be inserted into and removed from its jacket 14 without subjecting its grooves to abrasion, the material from which the wrapper is formed need not be soft but is desirably smooth surfaced and sufficiently stiff to enable the wrapped record to be easily inserted into the jacket 14 without the wrapper material yielding. While the marginal portions, once folded, tend to approach their closed position, they do not then prevent the placing of the record on or its lifting from the main portion 6 of the wrapper without sliding contact of its grooves with any part of the wrapper while the periphery of the record is digitally held.

It is claimed:

1. A record enclosure insertable into a jacket comprising a wrapper including a main portion dimensioned to enable a record, while held by its periphery, to be placed thereon, said member including marginal portions inwardly foldable over the thus positioned record thus to contain the record without frictional contact, one such portion being dimensioned to function as a cover in its folded position and the other portions being retaining flaps for the other three sides of the main portion of sufficient area to prevent the escape of the record when the cover establishing portion is held in its closed position and to prevent finger engagement with the record while the enclosed record is being inserted into or removed from its jacket, said retaining flaps being arcuate with respect to the center of the main portion shaped and dimensioned so that each does not overlap another.

2. The record enclosure of claim 1 in which the margins of the main portion and the cover-establishing portions are substantially rectangular but taper inwardly towards each other at the fold line between them thus to provide, when the enclosure is folded about a record, a leading edge portion that is narrower than the remainder of the enclosure.